(12) United States Patent
Usui et al.

(10) Patent No.: US 9,723,282 B2
(45) Date of Patent: Aug. 1, 2017

(54) IN-VEHICLE IMAGING DEVICE

(71) Applicant: Clarion Co., Ltd., Saitama-shi, Saitama (JP)

(72) Inventors: Tsutomu Usui, Tokyo (JP); Hirotomo Sai, Tokyo (JP)

(73) Assignee: Clarion Co., Ltd., Saitama-shi (JP)

( * ) Notice: Subject to any disclaimer, the term of this patent is extended or adjusted under 35 U.S.C. 154(b) by 215 days.

(21) Appl. No.: 14/419,025

(22) PCT Filed: Jun. 26, 2013

(86) PCT No.: PCT/JP2013/067578
§ 371 (c)(1),
(2) Date: Feb. 2, 2015

(87) PCT Pub. No.: WO2014/021032
PCT Pub. Date: Feb. 6, 2014

(65) Prior Publication Data
US 2015/0195500 A1    Jul. 9, 2015

(30) Foreign Application Priority Data
Aug. 3, 2012    (JP) .................................. 2012-172850

(51) Int. Cl.
*H04N 9/73*    (2006.01)
*H04N 9/77*    (2006.01)
(Continued)

(52) U.S. Cl.
CPC .......... *H04N 9/735* (2013.01); *G06K 9/00798* (2013.01); *G06T 7/90* (2017.01);
(Continued)

(58) Field of Classification Search
CPC .......... H04N 9/735; H04N 9/77; G06T 7/408; G06T 7/004; G06T 2207/30256;
(Continued)

(56) References Cited

U.S. PATENT DOCUMENTS

2003/0043030 A1*  3/2003  Kudo ................. G06K 9/00
                                                      340/435
2003/0058350 A1*  3/2003  Ishimaru ............ H04N 9/735
                                                      348/223.1
(Continued)

FOREIGN PATENT DOCUMENTS

JP          4-137988 A      5/1992
JP     2006-338555 A       12/2006
(Continued)

OTHER PUBLICATIONS

Extended European Search Report issued in counterpart European Application No. 13825969.2 dated Jan. 22, 2016 (Nine (9) pages).
(Continued)

*Primary Examiner* — Sath V Perungavoor
*Assistant Examiner* — Howard D Brown, Jr.
(74) *Attorney, Agent, or Firm* — Crowell & Moring LLP

(57) ABSTRACT

An in-vehicle imaging device is provided with a detection region setting unit for setting a detection region, which corresponds to a predetermined object to be detected within an imaging screen; a color signal determination unit for setting a specific color corresponding to the object to be detected, and for determining whether the color data of pixels contained in the detection region are close to the specific color; and a gain control unit for averaging the color data of pixels (approximate color pixels) that were determined to be close to the specific color within the detection region and for adjusting the color gain of the image signal on the basis of a differential value of the color data of the specific color and the average value of the color data of the approximate color pixels.

5 Claims, 15 Drawing Sheets

(51) Int. Cl.
 *G06K 9/00* (2006.01)
 *G06T 7/90* (2017.01)
(52) U.S. Cl.
 CPC ....... *H04N 9/77* (2013.01); *G06K 2207/1012* (2013.01); *G06T 2207/10016* (2013.01); *G06T 2207/30256* (2013.01)
(58) Field of Classification Search
 CPC ...... G06T 2207/10016; G06K 9/00798; G06K 2207/1012
 See application file for complete search history.

(56) References Cited

U.S. PATENT DOCUMENTS

| | | | | |
|---|---|---|---|---|
| 2003/0105578 A1* | 6/2003 | Takenaga | ............... | B60W 30/16 701/117 |
| 2005/0219379 A1* | 10/2005 | Shi | ............... | H04N 9/735 348/223.1 |
| 2006/0232684 A1* | 10/2006 | Miki | ............... | H04N 9/735 348/223.1 |
| 2010/0074469 A1 | 3/2010 | Nakamori et al. | | |
| 2012/0123613 A1* | 5/2012 | Waki | ............... | G08G 1/167 701/1 |
| 2013/0038736 A1* | 2/2013 | Yamamura | ............... | B60Q 1/143 348/148 |
| 2014/0307122 A1* | 10/2014 | Hayashi | ............... | H04N 9/07 348/223.1 |
| 2014/0361882 A1* | 12/2014 | Akiyama | ............... | G08G 1/16 340/435 |

FOREIGN PATENT DOCUMENTS

| | | |
|---|---|---|
| JP | 2007-28279 A | 2/2007 |
| JP | 2010-44472 A | 2/2010 |
| JP | 2012-23572 A | 2/2012 |
| WO | WO 2012/011713 A2 | 1/2012 |

OTHER PUBLICATIONS

International Search Report dated Sep. 24, 2013 with English translation (three (3) pages).

* cited by examiner

F I G. 7
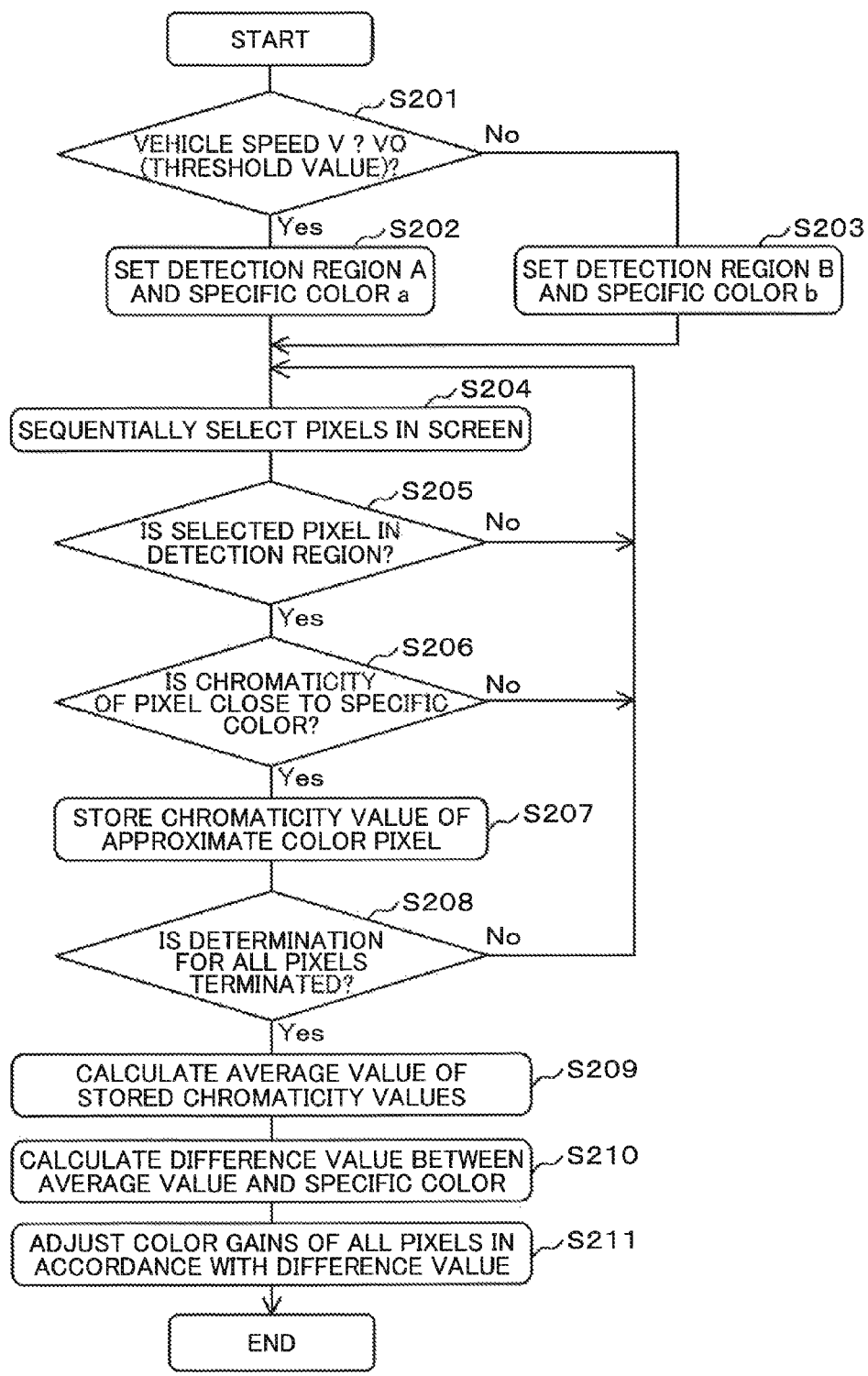

F I G. 1 1
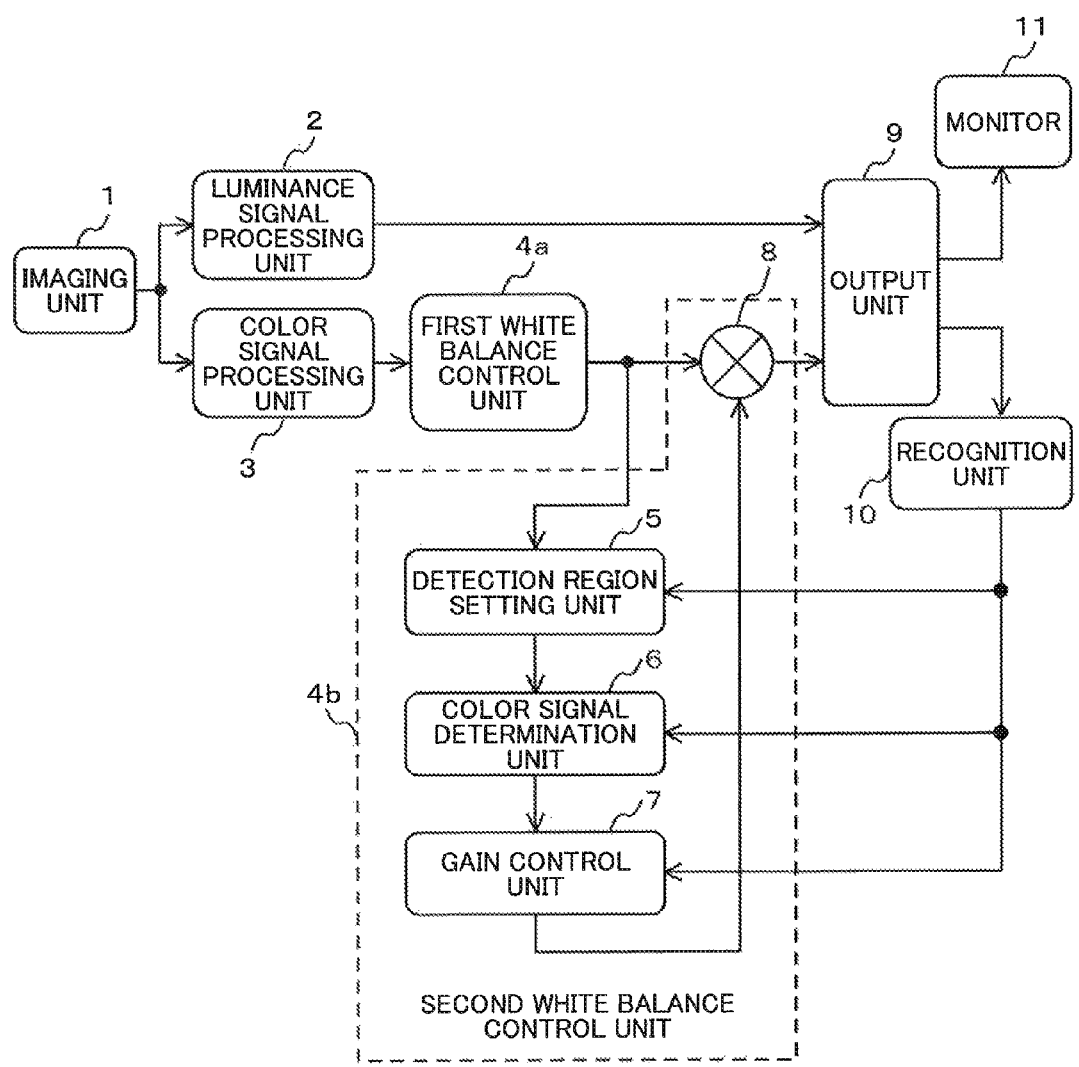

F I G. 1 2
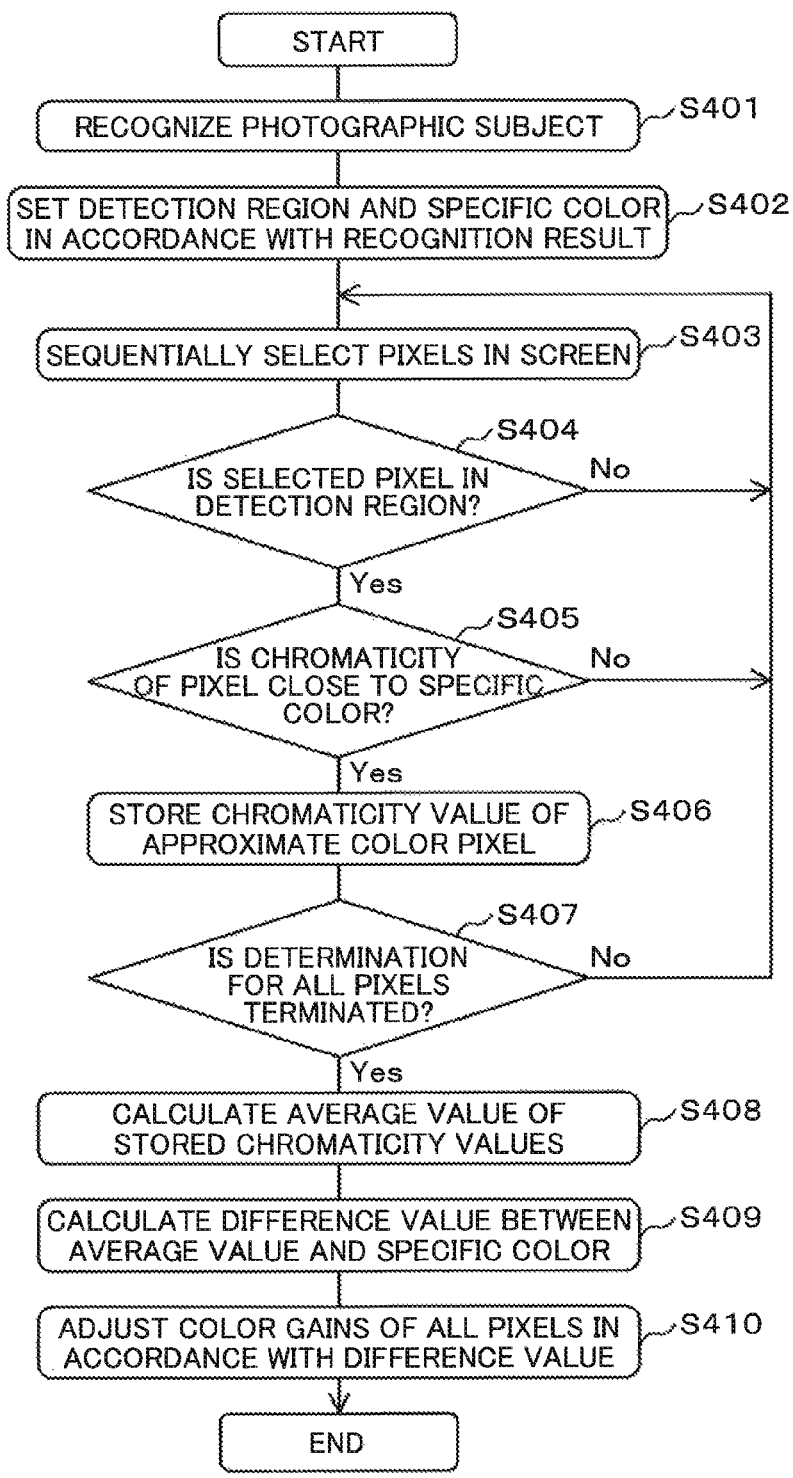

F I G. 1 4
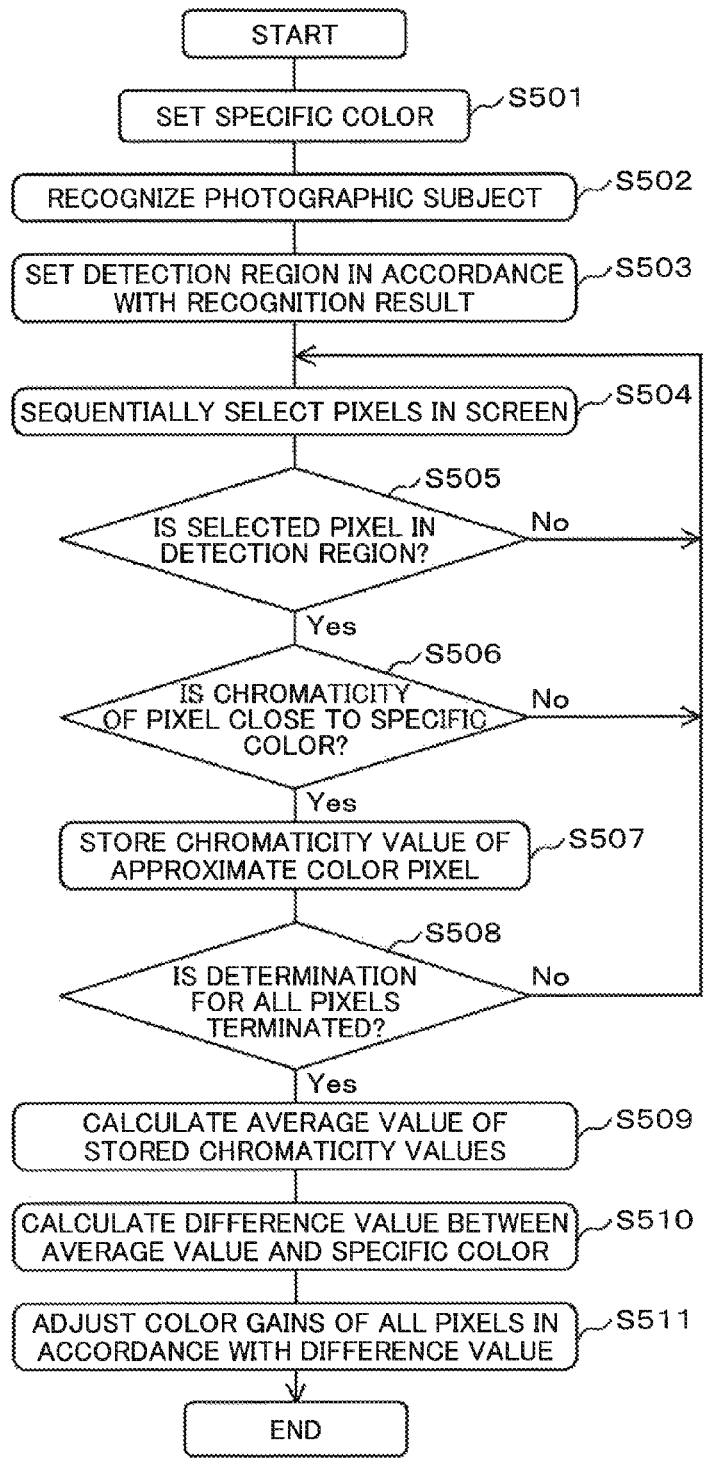

IN-VEHICLE IMAGING DEVICE

TECHNICAL FIELD

The present invention relates to an in-vehicle imaging device.

BACKGROUND ART

An in-vehicle imaging device is adapted to image a photographic subject such as a road by imaging means loaded on a vehicle, process an imaged image, recognize a desired object and display it for a driver and others. As a technique related to this, Patent Literature 1 discloses that it aims to "accurately detect road markings such as a lane mark even in a case where an irradiated state of the road is partially made different" and "to perform a white balance process of extracting a region that is approximate thereto in color feature amount and correcting each piece of pixel data in the extracted region so as to reduce a degree of divergence in level between color components, in accordance with the balance in level between the color components of the pixel data in the extracted region".

CITATION LIST

Patent Literature

Patent Literature 1: Japanese Unexamined Patent Application Publication No. 2006-338555

SUMMARY OF INVENTION

Technical Problem

As a main function of the in-vehicle imaging device, for example, there is a function of recognizing a lane that is the road marking as the photographic subject. It is necessary to correctly reproduce a color (for example, white) of the lane in order to correctly recognize the lane. In a case of a photographic subject other than the lane, it is necessary to correctly reproduce a color of a specific photographic subject to recognition. In order to correctly reproduce the color of the photographic subject, the white balance process is performed.

The technique described in the abovementioned Patent Literature 1 sets a range obtained from a result of determination as to whether it is at least or less than a predetermined threshold value by region extraction means 3 and a road surface range A4 that has been specified in advance on a color image by road surface range specification means 4 as a range to be detected (see FIG. 3). In that case, when there exist, for example, other vehicles, brake lamps, signals, street lamps and so forth other than a specific photographic subject (a lane mark and so forth) included in the road surface range of A4, it is hard to say that the white balance process suited for the specific photographic subject can be performed because it is influenced by them.

An object of the present invention is to provide an in-vehicle imaging device capable of performing the white balance process suited for the specific photographic subject.

Solution to Problem

In order to solve the abovementioned object, a configuration described in Claims is adopted. Taking up one example, the in-vehicle imaging device of the present invention includes a detection region setting unit for setting a detection region corresponding to a predetermined object to be detected in an imaging screen, for an image signal from the imaging unit, a color signal determination unit for setting a specific color corresponding to the object to be detected and determining, in regard to pixels included in the detection region, whether color data thereof are present in the vicinity of the specific color, and a gain control unit for averaging the color data of the pixels (hereinafter, approximate color pixels) that have been determined to be present in the vicinity of the specific color by the color signal determination unit concerned in the detection region, and adjusting a color gain of the image signal on the basis of a difference value between an average value of the color data of the approximate color pixels concerned and color data of the specific color.

Advantageous Effects of Invention

According to the present invention, there is such an advantageous effect that a recognition performance for the specific photographic subject is improved by correctly reproducing the color of the specific photographic subject.

BRIEF DESCRIPTION OF DRAWINGS

FIG. 7 A diagram showing a flowchart in Embodiment 2.

FIG. 11 A block configuration diagram showing a fourth embodiment of the in-vehicle imaging device according to the present invention.

FIG. 12 A diagram showing a flowchart in Embodiment 4.

FIG. 14 A diagram showing a flowchart in Embodiment 5.

DESCRIPTION OF EMBODIMENTS

In the following, several embodiments of the present invention will be described by using the drawings.

Embodiment 1

Figure 1:
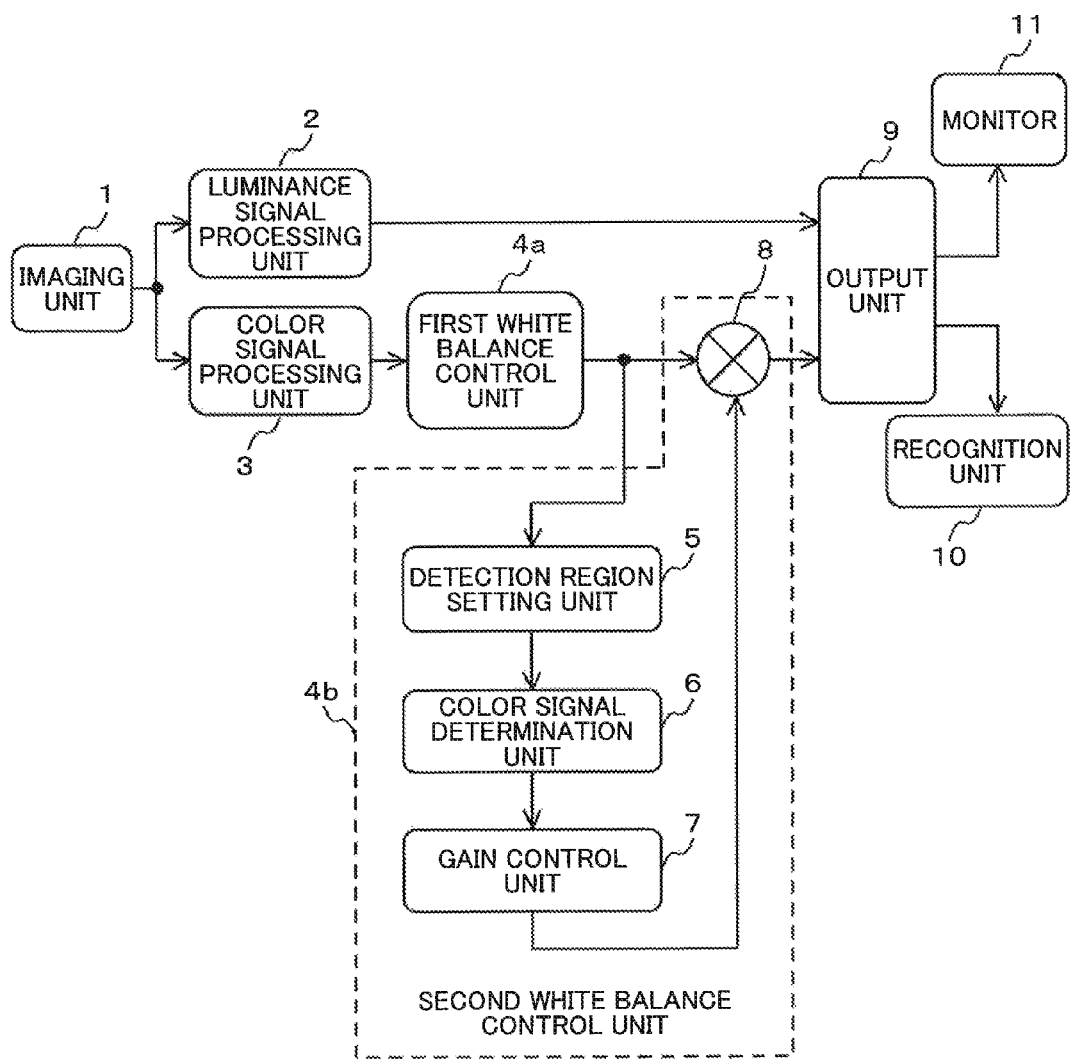
FIG. 1 A block configuration diagram showing a first embodiment of an in-vehicle imaging device according to the present invention.

FIG. 1 is a block configuration diagram showing a first embodiment of the in-vehicle imaging device according to the present invention. An imaging unit 1 has a lens for collecting incident light from a photographic subject, an imaging element for photo-electrically converting the light that the lens has collected and outputting it as an image signal, and an electronic shutter control unit and a gain control unit. A luminance signal processing unit 2 carries out processing related to a luminance signal of an image that the imaging unit 1 has imaged, and a color signal processing unit 3 carries out processing related to a color signal of the image that the imaging unit 1 has imaged.

A white balance control unit 4a performs control of white balance by using an image signal (a color signal) of the entire screen after the image signal is color-signal-processed. On the other hand, the second white balance control unit 4b (a part surrounded with a broke line) carries out control of the white balance by using an image signal (a color signal) of a partial region (a detection region) in the screen as described in the following. Incidentally, the color signal processing unit 3 and the first white balance control unit 4a may be united together.

The second white balance control unit 4b is configured as follows. The detection region setting unit 5 sets a "detection region" according to the position and the shape of a road marking as an object to be detected, for the image signal from the first white balance control unit 4a. Here, description will be made by taking a "lane" in a road as an example of the road marking that is the object to be detected.

A color signal determination unit 6 determines whether a color signal of each pixel in the detection region set by the detection region setting unit 5 is present in the vicinity of an original color (hereinafter, referred to as a "specific color") of the "lane" that is the object to be detected. Specifically speaking, determination as to whether a difference between color data (hereinafter, also referred to as chromaticity) of each pixel and color data of "white" that is the specific color of the "lane" is performed. As a result of determination, a pixel that has been determined to be present in the vicinity of the specific color will be called an "approximate color pixel". Then, with respect to the pixel that has been determined as the approximate color pixel, the color data (the chromaticity) thereof is memorized and stored.

A gain control unit 7 calculates an average value of the chromaticities of all of the approximate color pixels that are present in the aforementioned detection region that have been stored by the color signal determination unit 7. Then, it calculates a difference value between the average chromaticity and the chromaticity of the aforementioned specific color to obtain a correction amount of the color gain for reducing the difference value to zero.

A gain multiplication unit 8 multiplies the image signal from the first white balance control unit 4a and the gain correction amount obtained by the gain control unit 7 together. That is, it adjusts the pixels in the entire screen with the aforementioned color gain correction amount. Gain adjustment by the gain multiplication unit 8 may be either gain adjustment to R, G, B signals of the image signal or gain adjustment to R-Y, B-Y signals that the R, G, B signals have been converted into color difference signals. A color signal that has been determined to be in the vicinity (the approximate color pixel) of the specific color in the image signal as a result of gain adjustment is corrected such that it almost turns into the color signal of the specific color (white) of the "lane".

A luminance signal from the luminance signal processing unit 2 and the color signal that has been gain-adjusted by the gain multiplication unit 8 are synthesized, appropriately converted into a signal of forms such as an RGB signal and a YUV signal by an output unit 9 and output to a recognition unit 10 and a monitor 11. In the recognition unit 10, the road marking (here, the lane) that is the object to be detected is recognized from the input image, and in the monitor 11, the input image is displayed.

Figure 2:
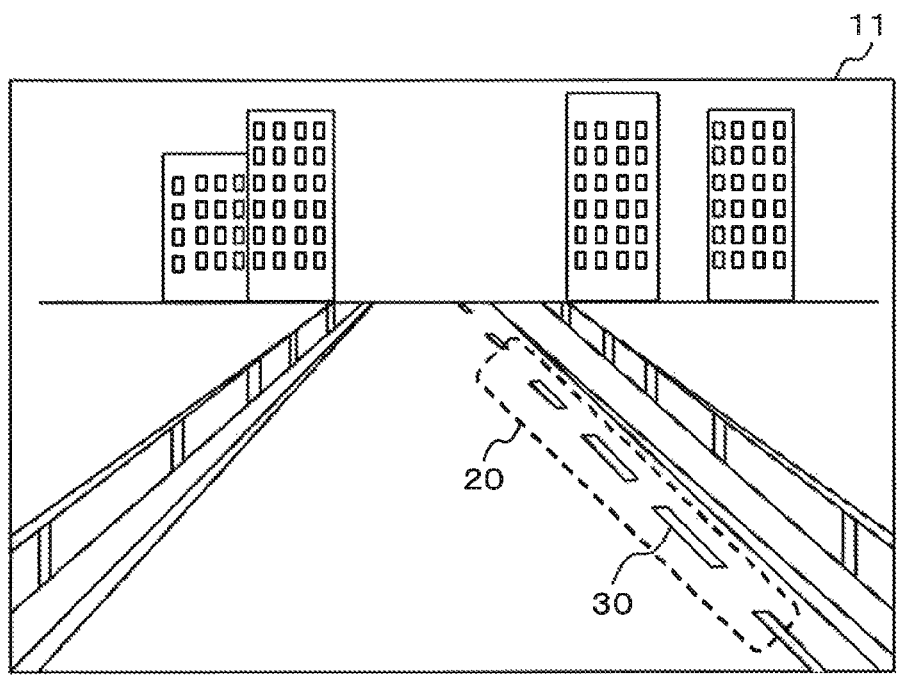
FIG. 2 A diagram showing an example of a detection region that a detection region setting unit 5 sets.

FIG. 2 is a diagram showing an example of the detection region that the detection region setting unit 5 sets. An imaged image of the front or the rear of the vehicle is displayed on the monitor 11. Here, a case where, with a lane 30 that is the road marking set as the object to be detected, a detection region 20 (shown by a broken line) for detecting the lane 30 has been set is shown. That is, the detection region 20 is set along the position and the slope of the lane 30 in the screen.

Figure 3:
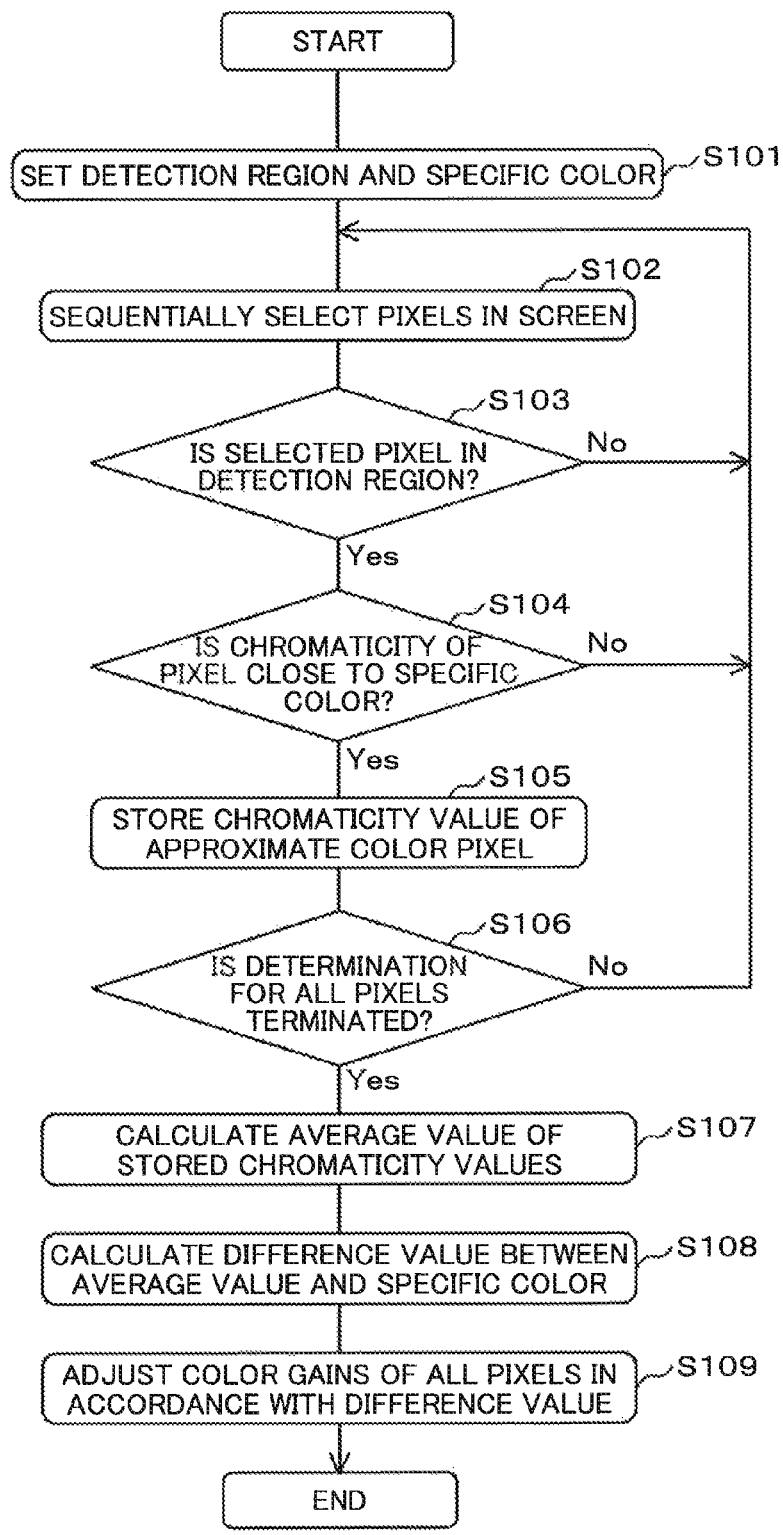
FIG. 3 A diagram showing a flowchart in a second white balance processing unit 4b.

FIG. 3 is a diagram showing a flowchart in the second white balance processing unit 4b. In S101, in the detection region setting unit 5 and the color signal determination unit 6, setting of a detection region and a specific color is performed. For example, the detection region 20 for detecting the lane 30 in FIG. 2 is set and white that is the specific color of the lane 30 is set. In S102, pixels in an imaging screen (one frame) are sequentially selected and color signals thereof are checked.

In S103, the detection region setting unit 5 determines whether the selected pixel is in the detection region. When Yes, it proceeds to S104. When No, it returns to S102 and the next pixel is selected. In S104, the color signal determination unit 6 determines whether the color data of the selected pixel is close to the specific color (white) (whether a difference in chromaticity value is within a predetermined range). When Yes, it proceeds to S105. When No, it returns to S102 and the next pixel is selected.

In S105, the pixel concerned is set as an approximate color pixel and the chromaticity value thereof is memorized and stored. In S106, whether determination for all of the pixels in the screen has been terminated is determined. When Yes, it proceeds to S107. When No, it returns to S102 and the next pixel is selected.

In S107, the gain control unit 7 calculates an average value of all of the chromaticity values in the detection region that have been stored as the approximate color pixels. In S108, a difference value between the calculated average value of the chromaticity values and the chromaticity value of the aforementioned specific color is calculated.

In S109, a correction amount of the color gain for reducing the difference value to zero is obtained and gain adjustment is performed on the pixels in the entire screen by the gain multiplication unit 8. Incidentally, even in a case where part of the object to be detected (the lane) is present on the outside of the set detection region, the color gain thereof can be adjusted by performing gain adjustment on the pixels in the entire screen.

In this way, according to the flow of a second white balance process, a color signal determination process is performed only on the pixels within the range of the detection region in all of the pixels (S103 and S104), and color gain adjustment is performed on the basis of only the data of the color signals that have been determined as the approximate color pixels close to the specific color by the color signal determination process (S107 to S109). As a result, since an image signal that has been determined to be in the vicinity of the specific color in the detection region is corrected so as to be surely converged to the specific color (white), the color of the specific object to be detected (the lane) can be correctly reproduced. That is, presence of noise sources (for example, other vehicles, the brake lamps, the signals, the street lamps and so forth) other than the object to be detected in the region is reduced by setting the detection region conforming to the object to be detected, and influences thereof can be reduced.

Figure 4:
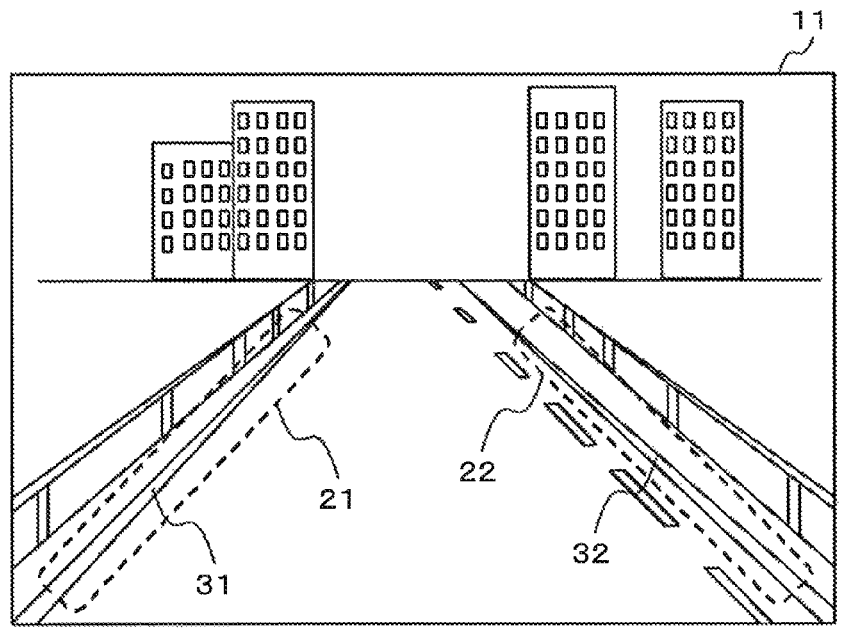
FIG. 4 A diagram showing an altered example of the detection region that the detection region setting unit 5 sets.

In the following, altered examples of Embodiment 1 will be described. FIG. 4 is a diagram showing the altered example of the detection region that the detection region setting unit 5 sets. Here, it is a case where two detection regions 21, 22 have been set for detecting lanes 31, 31 that are road markings present on the both sides of the road. A plurality of detection regions may be set in this way.

Figure 5:
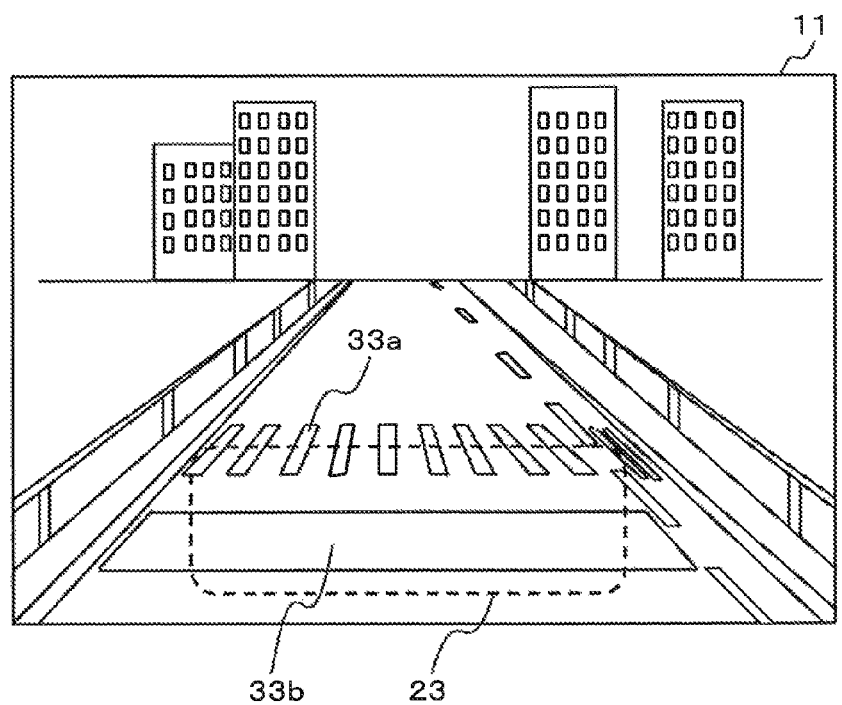
FIG. 5 A diagram showing an altered example of the detection region that the detection region setting unit 5 sets.

FIG. 5 is a diagram showing the altered example of the detection region that the detection region setting unit 5 sets. Here, it is a case where a pedestrian crossing 33a or a stop line 33b that is the road marking has been picked up as the object to be detected and a detection region 23 along them has been set. The shape of the detection region 23 in this case is set as a rectangular shape that extends in a horizontal direction of the screen so as to run along the pedestrian crossing and the stop line.

Embodiment 2

Figure 6:
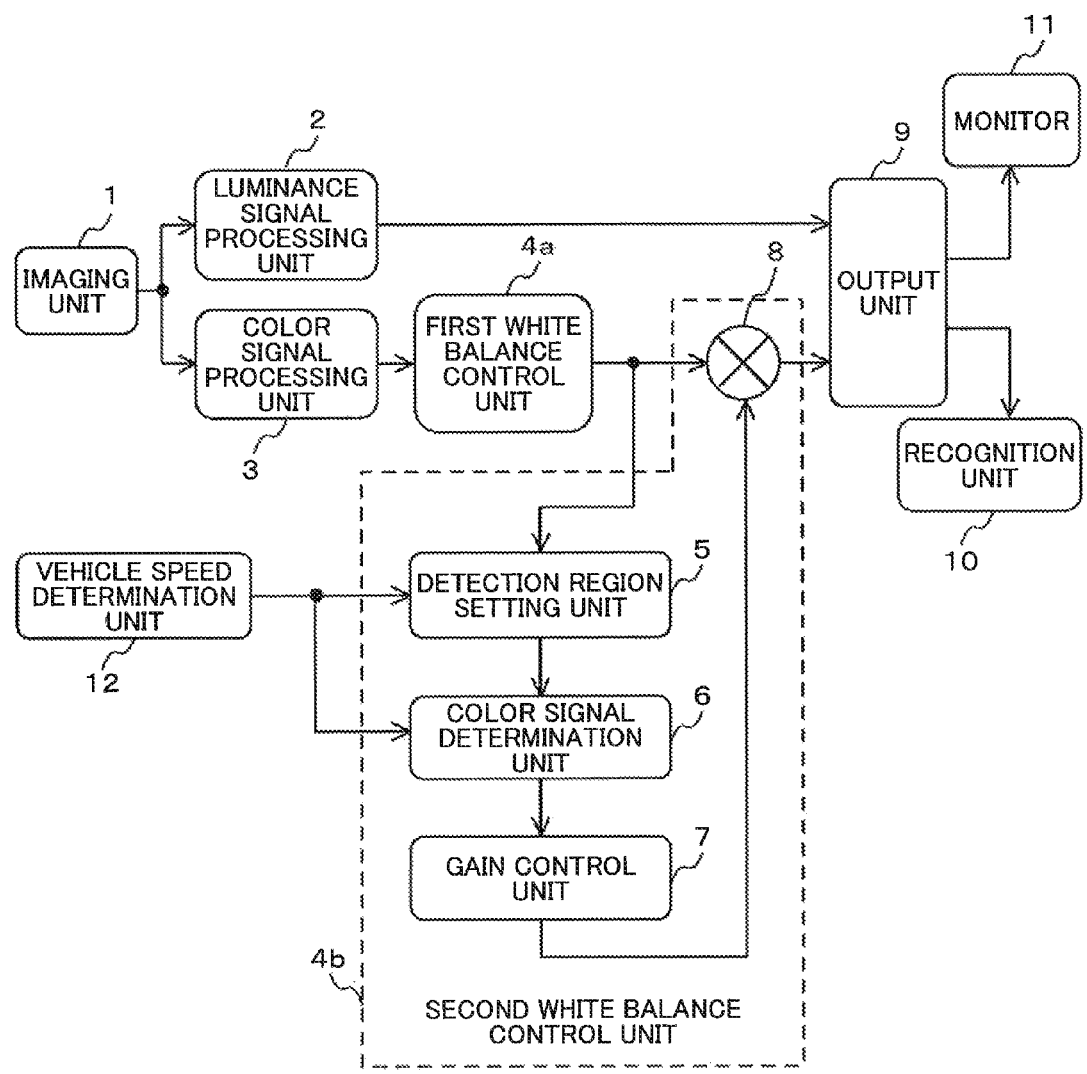
FIG. 6 A block configuration diagram showing a second embodiment of the in-vehicle imaging device according to the present invention.

FIG. 6 is a block configuration diagram showing a second embodiment of the in-vehicle imaging device according to the present invention. One difference from Embodiment 1 (FIG. 1) is that a vehicle speed determination unit 12 has been added so as to configure to control the detection region setting unit 5 and the color signal determination unit 6. The present embodiment has a function of making it possible to target a plurality of kinds (here, two kinds) of ones as the object to be detected and selecting one object to be detected on the basis of vehicle speed information of the vehicle speed determination unit 12.

That is, the detection region setting unit 5 can select and set one of two detection regions A, B in accordance with the object to be detected, and the color signal determination unit 6 can select and set one of two specific colors a, b in accordance with the object to be detected. For example, as the detection region A, the specific color a, the detection regions 20, 21, 22 corresponding to the lanes 30, 31, 32 in FIG. 2, FIG. 4 and the specific colors (white) thereof are set. In addition, as the detection region B, the specific color b, the detection region 23 corresponding to the pedestrian crossing 33a or the stop line 33b in FIG. 5 and the specific color (white) thereof are set.

In a case where a vehicle speed V is at least a predetermined speed V0 on the basis of the vehicle speed information from the vehicle speed determination unit 12, the "lane" is selected as the object to be detected and they are switched to the detection region A, the specific color a that correspond to this. The reason therefor is that while the image of the "lane" that is parallel with a traveling direction almost stands still in the screen not depending on a traveling speed, the image of the "pedestrian crossing or stop line" that is orthogonal to the traveling direction moves at a high speed in the screen on high speed traveling and therefore it becomes difficult to accurately detect it. Although in a case where the vehicle speed is less than the predetermined speed V0, both of the "lane" and the "pedestrian crossing or stop line" can be detected, it is assumed here that the "pedestrian crossing or stop line" is selected by switching to the detection region B, the specific color b.

FIG. 7 is a diagram showing a flowchart in Embodiment 2. One difference from Embodiment 1 (FIG. 3) is that the process in S101 has been changed to S201 to S203, and the others are the same. In S201, the vehicle speed information is acquired from the vehicle speed determination unit 12 and whether the vehicle speed V is at least the predetermined speed V0 is determined.

In a case where the vehicle speed is at least the predetermined speed V0, the detection region setting unit 5 and the color signal determination unit 6 set them to the detection region A and the specific color a in order to set the "lane" as the object to be detected in S202. In a case where the vehicle speed V is less than the predetermined speed V0, the detection region setting unit 5 and the color signal determination unit 6 set them to the detection region B and the specific color b in order to set the "pedestrian crossing or stop line" as the object to be detected in S203. The succeeding processes are the same as those in FIG. 3.

According to the present embodiment, since the object to be detected can be switched in accordance with the vehicle speed information, it results in the practical and easy-to-use in-vehicle imaging device. Incidentally, the same function can also be implemented by information on gear position in place of the vehicle speed determination unit 12. Further, it is also possible to acquire information on steering angle and to set the position of the detection region by shifting it in the screen.

Embodiment 3

Figure 8:
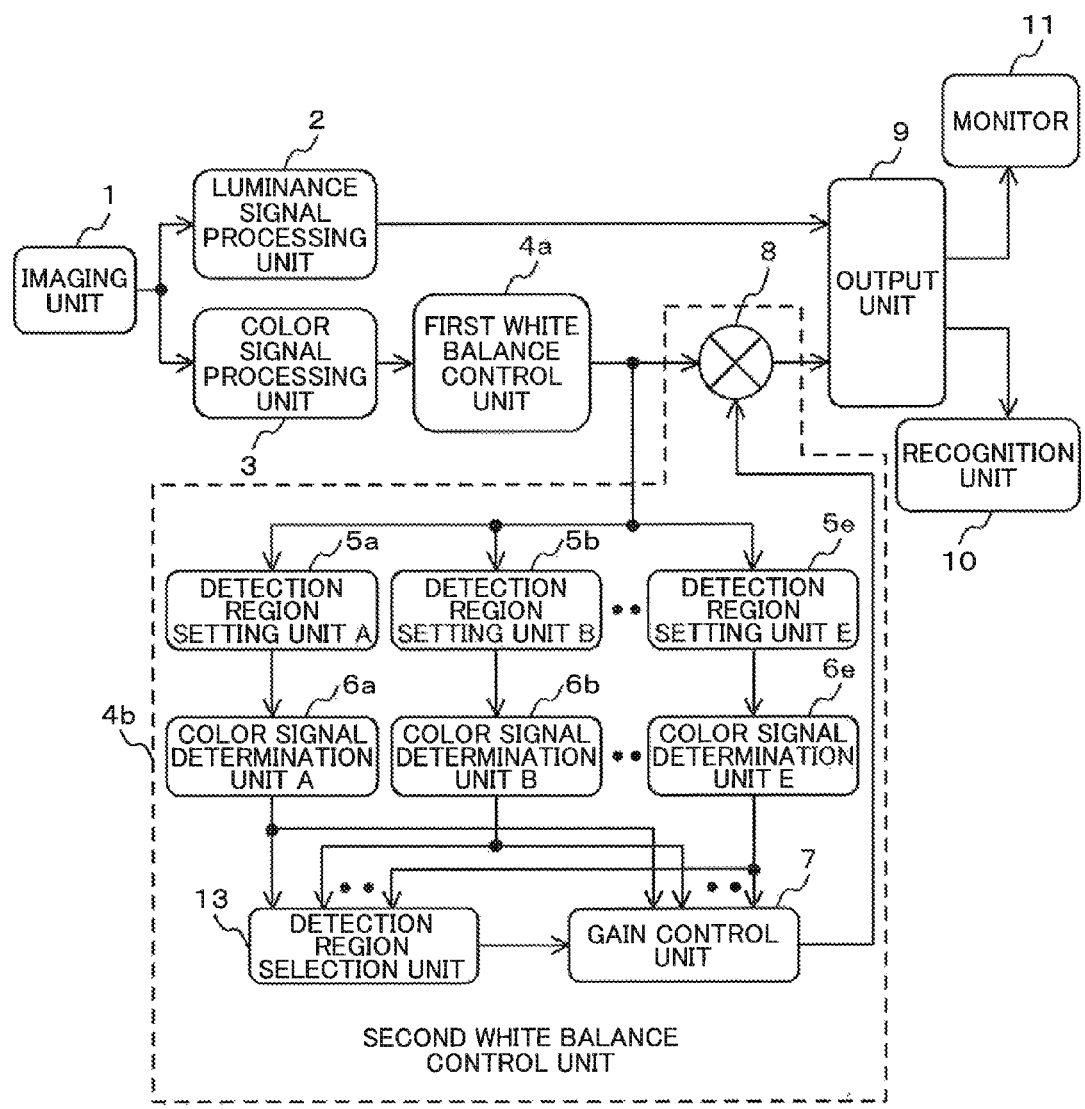
FIG. 8 A block configuration diagram showing a third embodiment of the in-vehicle imaging device according to the present invention.

FIG. 8 is a block configuration diagram showing a third embodiment of the in-vehicle imaging device according to the present invention. One difference from Embodiment 1 (FIG. 1) is that the detection region setting units and the color signal determination units are provided respectively plurally (here, five) and a detection region selection unit 13 has been added. It has a function of simultaneously setting a plurality of detection regions A to E and a plurality of specific colors a to e corresponding thereto by a plurality of these detection region setting units A to E (5a to 5e) and a plurality of color signal determination units A to E (6a to 6e) so as to detect the plurality of objects to be detected concurrently. The operations of the individual detection region setting units and the color signal determination units are the same as those in the embodiment (FIG. 1), and determinations respectively using the specific colors a to e are performed in units of the detection regions A to E.

However, in gain control, control that the number of pixels that have been determined as the approximate color pixels is taken into account is performed in units of the detection regions A to E. The detection region selection unit 13 determines whether the number of pixels that have been determined as the approximate color pixels is included in excess of a predetermined value in each detection region and selects the detection region that they are included in excess of the predetermined value and notifies the gain control unit 7 of it. The gain control unit 7 obtains a correction amount of the color gain in the selected detection region and causes the gain multiplication unit 8 to perform gain adjustment with this.

Figure 9:
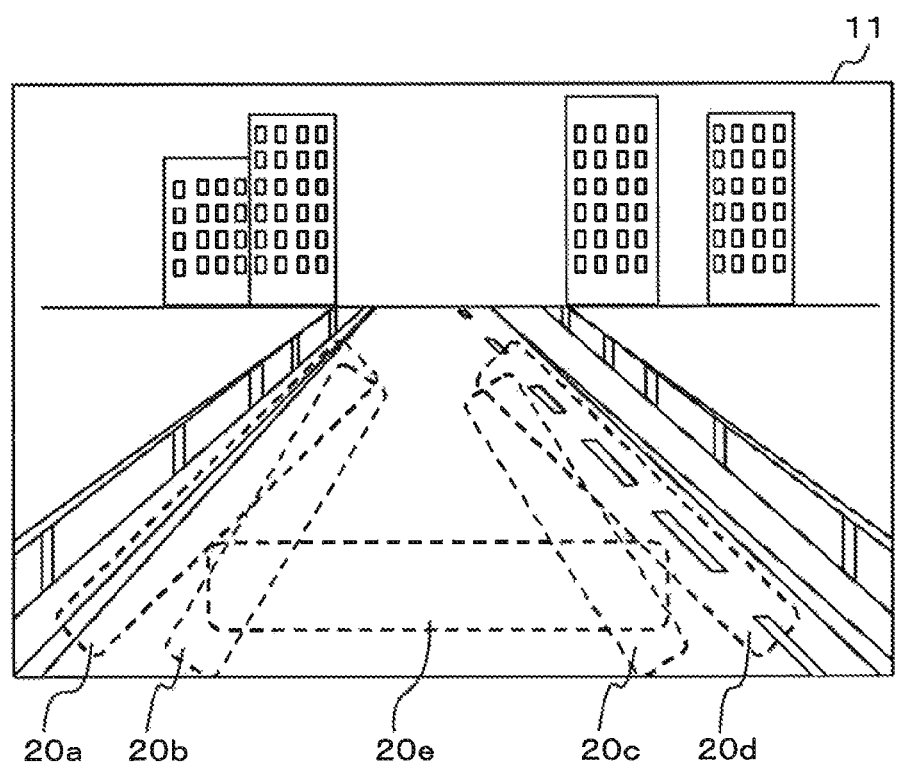
FIG. 9 A diagram showing examples of a plurality of detection regions that a plurality of detection region setting units A to E set.

FIG. 9 is a diagram showing an example of the plurality of detection regions that the plurality of detection region setting units A to E (5a to 5e) set. Here, a case where detection regions 20a to 20d that the object to be detected is the lane and a detection region 20e that the object to be detected is the pedestrian crossing or the stop line have been set is shown. Although among them, both of the detection regions 20a and 20b correspond to the lane on the road left side, they are set by shifting the positions and the slopes thereof. The same also applies to the detection regions 20c and 20d. It can be surely detected in any one of the detection regions by setting the plurality of detection regions for the same object to be detected (the lane) in this way, even in a case where the position and the slope in the screen of the object to be detected have been shifted. Incidentally, since in regard to a region that the object to be detected has not been detected (or it has been smaller than the predetermined number), it is unselected by the detection region selection unit 13, the influence caused by erroneous detection can be avoided.

Figure 10:
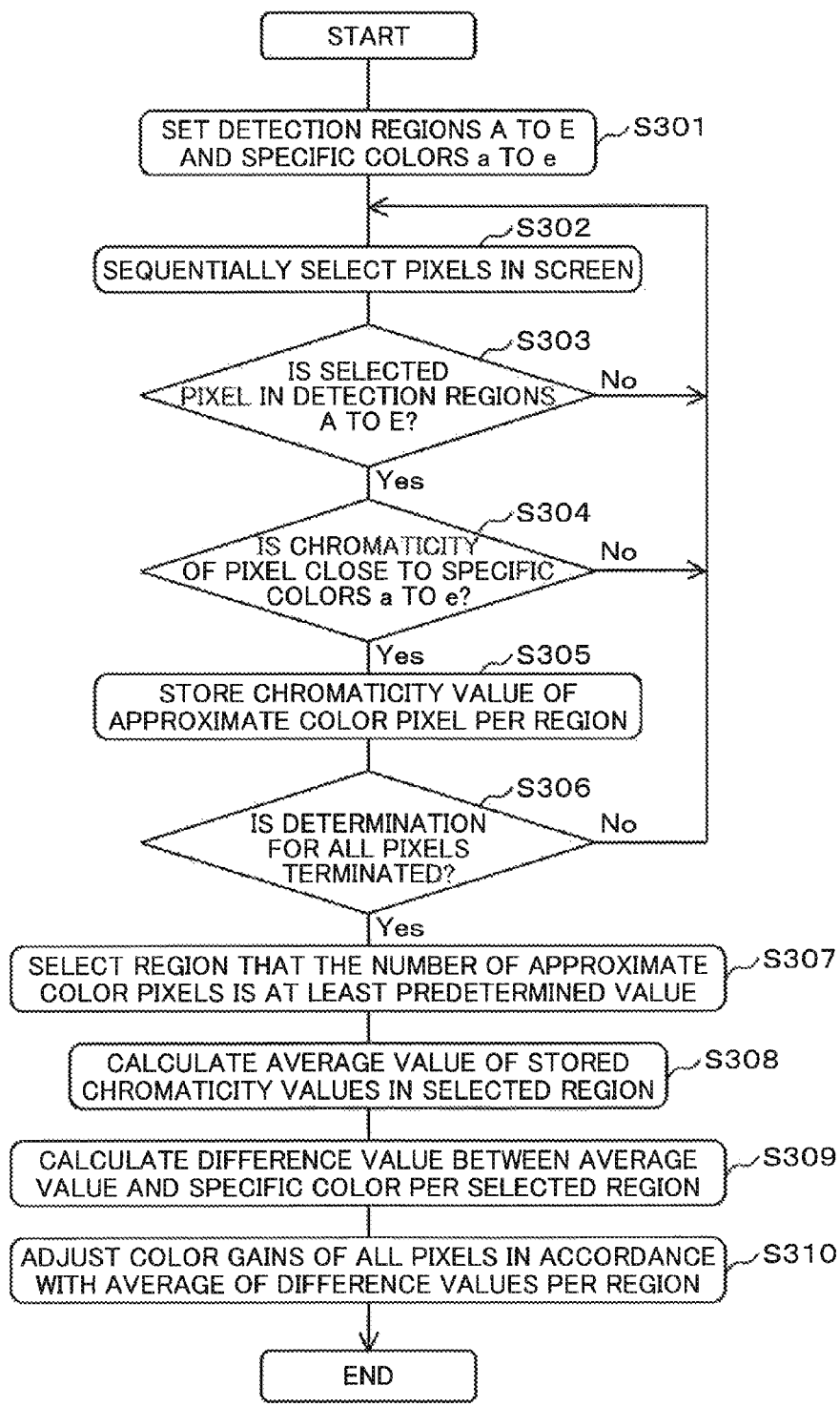
FIG. 10 A diagram showing a flowchart in Embodiment 3.

FIG. 10 is a diagram showing a flowchart in Embodiment 3. One difference from Embodiment 1 (FIG. 3) is that the pluralities of detection regions. Specific colors are set and determinations using the respective detection regions and specific colors are performed concurrently. In the following, description will be made focusing on changes.

In S301, setting of the pluralities of detection regions A to E and specific colors a to e is performed respectively by the detection region setting units 5a to 5e and the color signal determination units 6a to 6e. For example, the detection regions 20a to 20e in FIG. 9 are set and white is set as the specific colors a to e corresponding thereto. In S303, each of the detection region setting units 5a to 5e determines whether the selected pixel is in the detection regions A to E. If the selected pixel is included in at least one detection region, Yes will be set.

In S304, the color signal determination unit 6a to 6e corresponding to the detection region for which Yes has been set in S303 determines whether the chromaticity of the selected pixel is close to the chromaticity of the corresponding specific color. If the selected pixel is close to the chromaticity of at least one specific color, Yes will be set. In S305, the pixel concerned is set as the approximate color pixel of the aforementioned detection region and the chromaticity value thereof is memorized and stored.

In S307, the detection region selection unit 13 selects a detection region that the number of pixels that have been determined to be the approximate color pixels is included in excess of the predetermined value in the plurality of detection regions. In S308, the gain control unit 7 calculates an average value of all of the chromaticity values that have been stored as the approximate color pixels in the selected detection region.

In S309, a difference value between the average value of the chromaticity values calculated per selected region and the chromaticity value of the aforementioned specific color. In S310, an average of the correction amounts of the color gain for reducing the difference value per region to zero is obtained and gain adjustment is performed on the pixels of the entire screen.

According to the present embodiment, the plurality of detection regions can be set for the same object to be detected and even in a case where the position in the screen of the object to be detected has been shifted, the object to be detected can be surely detected in any one of the detection regions.

Embodiment 4

FIG. 11 is a block configuration diagram showing a fourth embodiment of the in-vehicle imaging device according to the present invention. One difference from Embodiment 1 (FIG. 1) is that a result of recognition of the object to be detected that the recognition unit 10 has recognized is fed back to the detection region setting unit 5, the color signal determination unit 6, and the gain control unit 7. That is, the detection region setting unit 5 sets the detection region conforming to the position and the shape of the object to be detected that the recognition unit 10 has recognized. The color signal determination unit 6 and the gain control unit 7 set the color of the object to be detected that the recognition unit 10 has recognized as the specific color. Here, the object to be detected that the recognition unit 10 recognizes may be, for example, the lane, the pedestrian crossing, the stop line that are the aforementioned road markings, or a road sign. In this way, in the present embodiment, the region and the specific color to be set are determined on the basis of a result of recognition of the actually obtained photographic subject. Thereby, even in a case where the position and the color of the photographic subject have been shifted from the original position and color due to changes in road condition and imaging environment (illumination light), the determination accuracy can be maintained.

FIG. 12 is a diagram showing a flowchart in Embodiment 4. One difference from Embodiment 1 (FIG. 1) is that the process in S101 has been changed to S401 to S402, and the others are the same.

In S401, the recognition unit 10 receives the image signal from the output unit 9 and recognizes the specific photographic subject (the object to be detected). In S402, the detection region setting unit 5 and the color signal determination unit 6 acquire a result of recognition of the specific photographic subject from the recognition unit 10 and set the detection region and the specific color in accordance with the result of recognition. The succeeding processes are the same as those in FIG. 3.

According to the present embodiment, since region determination and color signal determination are performed on the basis of the result of recognition of the actually obtained photographic subject, there is such an advantageous effect that the determination accuracy can be maintained and the color of the specific photographic subject can be displayed with the one that is close to the actually imaged color even in a state that the road condition and the imaging environment have been changed.

Embodiment 5

Figure 13:
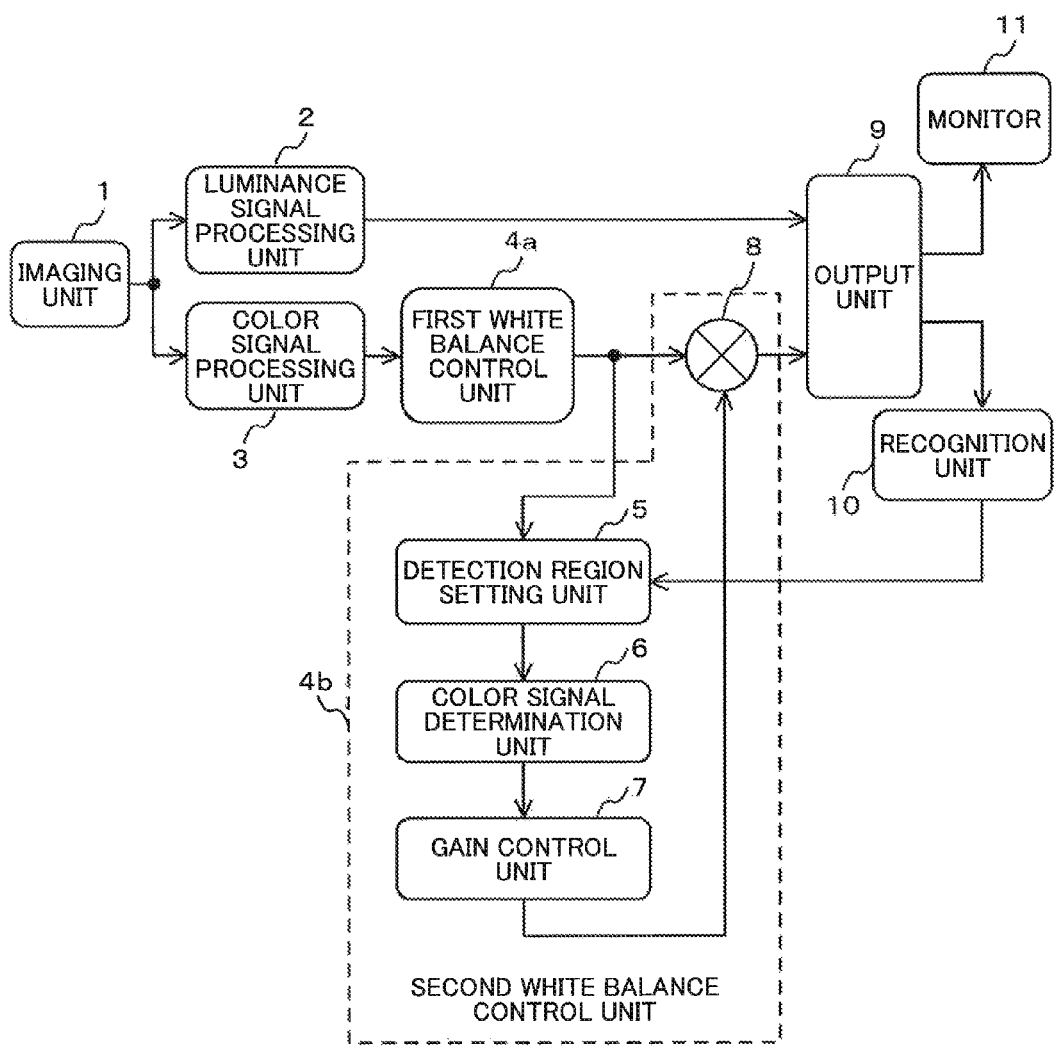
FIG. 13 A block configuration diagram showing a fifth embodiment of the in-vehicle imaging device according to the present invention.

FIG. 13 is a block configuration diagram showing a fifth embodiment of the in-vehicle imaging device according to the present invention. Although the result of recognition by the recognition unit 10 is used also in the present embodiment, one difference from Embodiment 4 (FIG. 11) is that the result of recognition of the object to be detected that the recognition unit 10 has recognized is fed back only to the detection region setting unit 5. In the color signal determination unit 6 and the gain control unit 7, the specific color of the object to be detected is set not depending on the result of recognition. Here, the objects to be detected are, for example, the aforementioned lane, pedestrian crossing, stop line, road marking and so forth and, for example, white, yellow and so forth are set as the specific colors corresponding thereto. Although in the present embodiment, the detection region to be set is based on the result of recognition of the actually obtained photographic subject in this way, it is characterized in that the original color of the photographic subject is set as the specific color to be set.

FIG. 14 is a diagram showing a flowchart in Embodiment 5. One difference from Embodiment 4 (FIG. 12) is that the processes in S401 to S402 have been changed to S501 to S503, and the others are the same.

In S501, setting of the specific color is performed also by the color signal determination unit 6. For example, if the object to be detected is the lane, white will be set as the specific color. In S502, the recognition unit 10 receives the image signal from the output unit 9 and recognizes the specific photographic subject (the lane).

In S503, the detection region setting unit 5 acquires the result of recognition of the photographic subject (the lane) from the recognition unit 10 and sets the detection region in accordance with the result of recognition. The succeeding processes are the same as those in FIG. 12.

According to the present embodiment, since region determination is performed on the basis of the result of recognition of the actually obtained photographic subject, the accuracy in detection of the photographic subject is improved while the color of the specific photographic subject can be correctly reproduced to the original color in gain adjustment.

Figure 15:
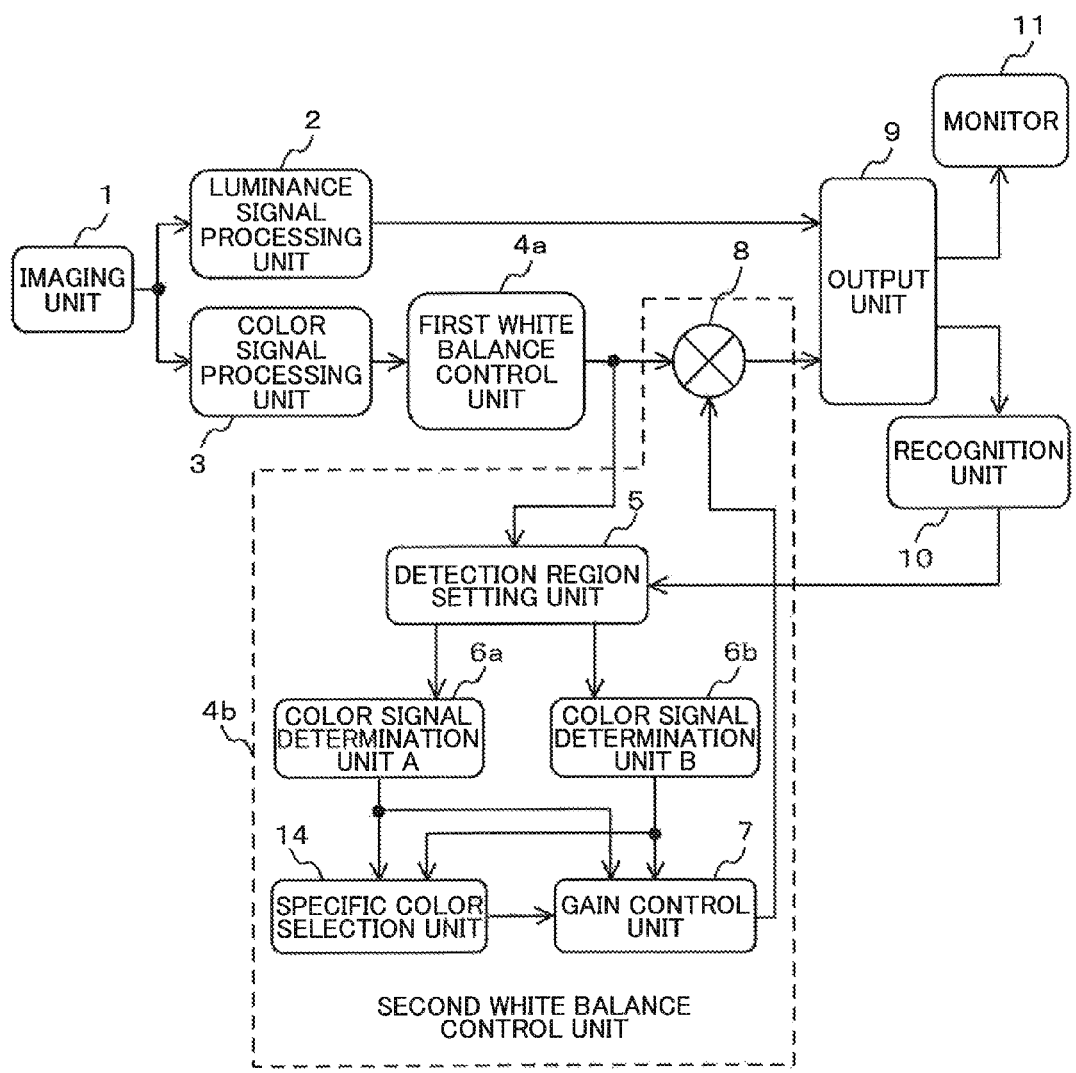
FIG. 15 A block configuration diagram showing an altered example of the in-vehicle imaging device in FIG. 13.

In the following, altered examples of Embodiment 5 will be described. FIG. 15 is a block configuration diagram showing the altered example of the in-vehicle imaging device in FIG. 13. One difference from FIG. 13 is that a plurality (here, two) of color signal determination units A, B (6a, 6b) and a specific color selection unit 14 have been provided. The detection region setting unit 5 sets the detection region for one object to be detected (for example, the lane). On the other hand, the color signal determination units A, B (6a, 6b) set mutually different specific colors. For example, white and yellow are set as the specific colors a, b for the lane. Then, they perform determinations of approximate color pixels for the respective specific colors concurrently. The specific color selection unit 14 compares with each other the numbers of pixels that have been determined as the approximate color pixels by the respective color signal determination units A, B, selects the specific color (a or b) that is larger in number of pixels and notifies the gain control unit 7 of it. The gain control unit 7 obtains the correction amount of the color gain for the selected specific color and causes the gain multiplication unit 8 to perform gain adjustment with this. Thereby, even on the road where, for example, as the colors of the lanes, the case of white and the case of yellow are mixed, gain adjustment can be performed in coordination with the color to be detected.

Figure 16:
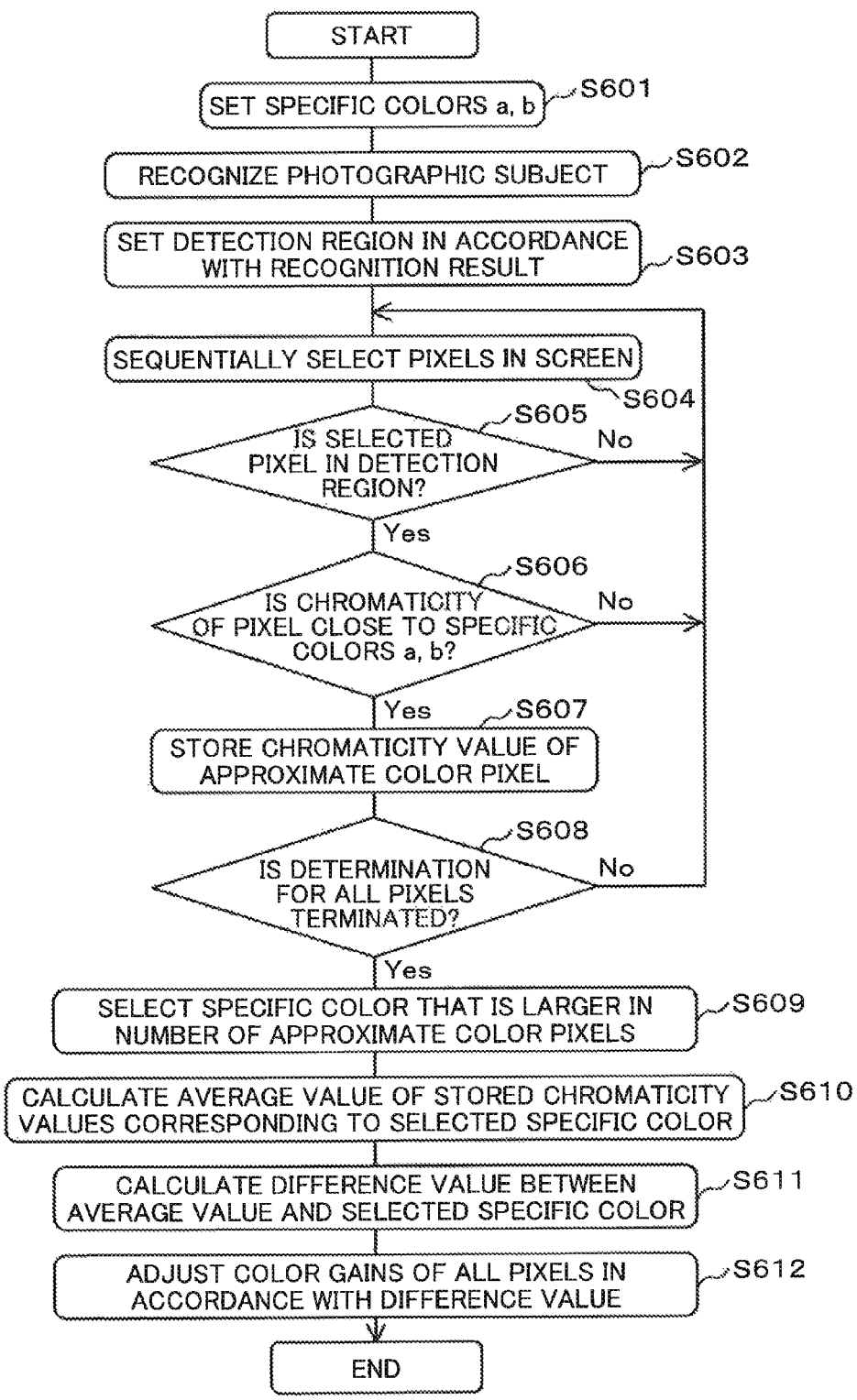
FIG. 16 A diagram showing a flowchart in FIG. 15.

FIG. 16 is a flowchart in FIG. 15 (the altered example). One difference from FIG. 14 is processes in S601, S606, S607, S609, and S610.

In S601, setting of the mutually different specific colors a, b is performed in the color signal determination units A, B (6a, 6b). For example, the specific color a is set to white and the specific color b is set to yellow.

In S606, the color signal determination units A, B each determines whether the chromaticity of the selected pixel is close to the chromaticity of each specific color (a or b). If it is close to one of the specific colors, Yes will be set. In S607, regarding the approximate color pixel that has been determined to be close to the specific color, the chromaticity value of the pixel concerned is memorized and stored per specific color.

In S609, the specific color selection unit 14 compares with each other the numbers of pixels that have been determined as the approximate color pixels regarding the respective specific colors and selects the specific color (a or b) that is larger in number of pixels. In S610, the gain control unit 7 calculates the average value of all of the stored chromaticity values corresponding to the selected specific color. The succeeding processes are the same as those in FIG. 14.

Although the two specific colors have been set in the present altered example, a plurality of two or more specific colors may be set. According to the present altered example, since color gain adjustment is performed by selecting the specific color that is larger (maximum) in number of approximate color pixels in the plurality of specific colors, even in a case where the photographic subject to be detected includes a plurality of colors or in a case where the color of the photographic subject is switched depending on the road condition, the color of the photographic subject can be reproduced by favorably coping with it.

REFERENCE SIGNS LIST

1: imaging unit, 2: luminance signal processing unit, 3: color signal processing unit, 4a: first white balance control unit, 4b: second whit balance control unit, 5: detection region setting unit, 6: color signal determination unit, 7: gain control unit, 8: gain multiplication unit, 9: output unit, 10: recognition unit, 11: monitor, 12: vehicle speed determination unit, 13: detection region selection unit, 14: specific color selection unit, 20 to 23: detection region, 30 to 33: object to be detected.

The invention claimed is:

1. An in-vehicle imaging device that images a photographic subject by an imaging unit loaded on a vehicle, comprising:
   a detection region setting unit for setting a detection region corresponding to a predetermined object to be detected in an imaging screen, for an image signal from the imaging unit;
   a color signal determination unit for setting a specific color corresponding to the object to be detected and determining, in regard to pixels included in the detection region, whether color data thereof are present in the vicinity of the specific color;
   a gain control unit for averaging the color data of the pixels (hereinafter, approximate color pixels) that have been determined to be present in the vicinity of the specific color by the color signal determination unit concerned in the detection region, and adjusting a color gain of the image signal on the basis of a difference value between an average value of the color data of the approximate color pixels concerned and color data of the specific color; and
   a vehicle speed determination unit for determining a vehicle speed of the vehicle;
   wherein the detection region setting unit selects, based on the vehicle speed, one from a plurality of kinds of objects to be detected and sets the detection region corresponding to the selected object; and
   wherein the color signal determination unit selects, based on the vehicle speed, the one of the plurality of kinds of objects to be detected and sets the specific color corresponding to the selected object.

2. The in-vehicle imaging device according to claim 1, comprising:
   a plurality of detection region setting units for setting mutually different detection regions, as the detection region setting unit;
   a plurality of color signal determination units for setting specific colors corresponding to the respective detections regions that the plurality of detection region setting units concerned have set and determining, in regard to the pixels included in the respective detection regions concerned, whether color data thereof are present in the vicinity of the respective specific colors, as the color signal determination unit; and
   a detection region selection unit for selecting a detection region that the number of pixels that have been determined as the approximate color pixels by the plurality of color signal determination units concerned is included in excess of a predetermined value, from within the plurality of detection regions, wherein the gain control unit adjusts the color gain of the image signal on the basis of the color data of the approximate color pixel in the detection region that has been selected by the detection region selection unit concerned and the color data of the specific color corresponding to the detection region concerned.

3. The in-vehicle imaging device according to claim 1, comprising:

a recognition unit for recognizing the object to be detected from the image signal, wherein the detection region setting unit sets the detection region for the object to be detected on the basis of a result of recognition by the recognition unit, and the color signal determination unit sets the specific color for the object to be detected on the basis of the result of recognition by the recognition unit.

4. The in-vehicle imaging device according to claim 1, comprising:

a recognition unit for recognizing the object to be detected from the image signal, wherein the detection region setting unit sets the detection region for the object to be detected on the basis of a result of recognition by the recognition unit.

5. The in-vehicle imaging device according to claim 4, comprising:

a plurality of color signal determination units for setting a plurality of mutually different specific colors for the object to be detected and determining, in regard to pixels included in the detection region, whether color data thereof are present in the vicinity of the respective specific colors, as the color signal determination unit; and a specific color selection unit for selecting a specific color that the number of pixels determined to be approximate color pixels by the plurality of color signal determination units concerned is maximized, from within the plurality of specific colors, wherein the gain control unit adjusts the color gain of said image signal on the basis of the color data of the approximate color pixel corresponding to the specific color selected by the specific color selection unit concerned and the color data of the specific color concerned.

* * * * *